US011420259B2

(12) United States Patent
Osgood et al.

(10) Patent No.: US 11,420,259 B2
(45) Date of Patent: Aug. 23, 2022

(54) MATED COMPONENTS AND METHOD AND SYSTEM THEREFORE

(71) Applicant: General Electric Company, Schenectady, NY (US)

(72) Inventors: Daniel Endecott Osgood, Loveland, OH (US); Daniel Peter Kiefer, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 354 days.

(21) Appl. No.: 16/675,384

(22) Filed: Nov. 6, 2019

(65) Prior Publication Data

US 2021/0129221 A1 May 6, 2021

(51) Int. Cl.
  *B22F 10/00* (2021.01)
  *B33Y 10/00* (2015.01)
  (Continued)

(52) U.S. Cl.
  CPC ............. *B22F 10/00* (2021.01); *B33Y 10/00* (2014.12); *B33Y 50/02* (2014.12); *B33Y 80/00* (2014.12);
  (Continued)

(58) Field of Classification Search
  CPC ............. F28F 9/0263; F28F 2009/0297; F28F 9/0224; F28F 2009/0292; F28F 2225/08;
  (Continued)

(56) References Cited

U.S. PATENT DOCUMENTS 2,426,104 A * 8/1947 Johnstone ........... E05B 27/0082
  70/421
3,290,910 A * 12/1966 Laviana ................ E05B 29/004
  70/383
(Continued)

FOREIGN PATENT DOCUMENTS

CN  101916387 B  9/2012
DE  102014013139 A1  3/2016
(Continued)

OTHER PUBLICATIONS

Gujba et al., Laser Peening Process and its Impact on Materials Properties in Comparison with Shot Peening and Ultrasonic Impact Peening, Materials, vol. 7, 2014, pp. 7925-7974.
(Continued)

*Primary Examiner* — Lawrence Averick
(74) *Attorney, Agent, or Firm* — Dinsmore & Shohl LLP

(57) ABSTRACT

A method of forming a mated component pair includes forming a first geometry on a first mating surface of a first component and a complementary second geometry on a second mating surface of a second component. The first geometry and the second geometry can be determined from a geometric key associated with a component identifier, e.g., by inputting the geometric key into a mathematical algorithm or random number generator. When a replacement for the second component is needed, the component identifier may be obtained from the first component, the component identifier may be used to obtain the geometric key, and the geometric key may then be used to determine the second geometry. The second geometry may then be formed on the second component such the second component may properly mate with the mated first component.

20 Claims, 7 Drawing Sheets

(51) Int. Cl.
*B33Y 80/00* (2015.01)
*B33Y 50/02* (2015.01)
*H04L 9/08* (2006.01)
*G06F 7/58* (2006.01)
*B22F 10/10* (2021.01)

(52) U.S. Cl.
CPC ............ *B22F 10/10* (2021.01); *G06F 7/588* (2013.01); *H04L 9/0894* (2013.01)

(58) Field of Classification Search
CPC ......... F28F 9/02; B22F 10/00; B22F 2999/00; B22F 5/10; B22F 10/28; B22F 10/47; B33Y 10/00; B33Y 70/00; B33Y 80/00; Y02P 10/25
See application file for complete search history.

(56) References Cited

U.S. PATENT DOCUMENTS

| | | | |
|---|---|---|---|
| 3,538,590 | A | 11/1970 | Bederman et al. |
| 3,565,676 | A | 2/1971 | Holzl |
| 3,594,216 | A | 7/1971 | Charles et al. |
| 3,656,995 | A | 4/1972 | Reedy, Jr. |
| 4,069,696 | A * | 1/1978 | Steinbach ............ E05B 27/083 70/404 |
| 4,350,883 | A | 9/1982 | Lagarde |
| 4,412,397 | A * | 11/1983 | Bayn ....................... F41A 17/00 42/70.11 |
| 4,784,614 | A | 11/1988 | Sadigh-Behzadi |
| 4,806,740 | A | 2/1989 | Gold et al. |
| 5,183,685 | A | 2/1993 | Yamazaki |
| 5,241,245 | A | 8/1993 | Barnes et al. |
| 5,304,282 | A | 4/1994 | Flamm |
| 5,313,193 | A | 5/1994 | Dubois et al. |
| 5,387,380 | A | 2/1995 | Cima et al. |
| 5,546,462 | A | 8/1996 | Indeck et al. |
| 5,584,113 | A | 12/1996 | Hovorka |
| 5,620,625 | A | 4/1997 | Sauron et al. |
| 5,656,329 | A | 8/1997 | Hampden-Smith et al. |
| 6,337,122 | B1 | 1/2002 | Grigg et al. |
| 6,475,902 | B1 | 11/2002 | Hausmann et al. |
| 6,492,651 | B2 | 12/2002 | Kerekes |
| 6,548,899 | B2 | 4/2003 | Ross |
| 6,640,632 | B1 | 11/2003 | Hatanaka et al. |
| 6,743,473 | B1 | 6/2004 | Parkhe et al. |
| 6,850,592 | B2 | 2/2005 | Schramm et al. |
| 6,861,613 | B1 | 3/2005 | Meiners et al. |
| 6,918,036 | B1 | 7/2005 | Drews |
| 6,976,627 | B1 | 12/2005 | Culp et al. |
| 7,045,738 | B1 | 5/2006 | Kovacevic et al. |
| 7,148,448 | B2 | 12/2006 | Warren et al. |
| 7,199,367 | B2 | 4/2007 | Favro et al. |
| 7,217,102 | B2 | 5/2007 | Rockstroh et al. |
| 7,250,864 | B2 | 7/2007 | Murofushi et al. |
| 7,584,833 | B2 | 9/2009 | Howells |
| 7,585,450 | B2 | 9/2009 | Wahlstrom et al. |
| 7,602,963 | B2 | 10/2009 | Nightingale et al. |
| 7,621,733 | B2 | 11/2009 | Reynolds et al. |
| 7,690,909 | B2 | 4/2010 | Wahlstrom |
| 7,784,183 | B2 | 8/2010 | Rockstroh et al. |
| 7,850,885 | B2 | 12/2010 | Philippi et al. |
| 7,974,722 | B2 | 7/2011 | Boyl-Davis et al. |
| 8,017,055 | B2 | 9/2011 | Davidson et al. |
| 8,126,688 | B2 | 2/2012 | Hollingshead et al. |
| 8,222,567 | B2 | 7/2012 | Mathai et al. |
| 8,506,836 | B2 | 8/2013 | Szuromi et al. |
| 8,536,860 | B2 | 9/2013 | Boenisch |
| 8,935,286 | B1 | 1/2015 | Westerman, Jr. et al. |
| 8,973,829 | B2 | 3/2015 | Atkinson et al. |
| 8,985,471 | B2 | 3/2015 | Freeman |
| 9,036,916 | B2 | 5/2015 | Le |
| 9,074,927 | B2 | 7/2015 | Singh et al. |
| 9,126,167 | B2 | 9/2015 | Ljungblad |
| 9,250,183 | B2 | 2/2016 | Smith et al. |
| 9,311,652 | B2 | 4/2016 | Farn et al. |
| 9,360,589 | B1 | 6/2016 | Meinhold et al. |
| 9,400,910 | B2 | 7/2016 | Kumar et al. |
| 9,414,891 | B2 | 8/2016 | Kieser |
| 9,424,503 | B2 | 8/2016 | Kieser |
| 9,629,227 | B2 | 4/2017 | Bello et al. |
| 9,950,370 | B2 * | 4/2018 | Roth-Fagaraseanu .... B22F 7/02 |
| 10,034,714 | B2 | 7/2018 | Park |
| 10,034,964 | B2 | 7/2018 | Bonassar et al. |
| 10,240,365 | B2 * | 3/2019 | Almomani .......... E05B 47/0001 |
| 10,487,660 | B2 * | 11/2019 | Lacy ........................ F01D 5/18 |
| 10,895,160 | B1 * | 1/2021 | Sinclair ..................... F01D 5/02 |
| 10,908,050 | B2 * | 2/2021 | Schleif ..................... F01D 5/14 |
| 2002/0106412 | A1 | 8/2002 | Rowe et al. |
| 2002/0126889 | A1 | 9/2002 | Pikler et al. |
| 2005/0042764 | A1 | 2/2005 | Sailor et al. |
| 2008/0159529 | A1 | 7/2008 | Aarts et al. |
| 2008/0241404 | A1 | 10/2008 | Allaman et al. |
| 2009/0286007 | A1 | 11/2009 | Brancher |
| 2010/0289627 | A1 | 11/2010 | McAllister et al. |
| 2012/0183701 | A1 | 7/2012 | Pilz et al. |
| 2013/0156626 | A1 * | 6/2013 | Roth-Fagaraseanu ...................... B22F 5/009 419/6 |
| 2013/0193214 | A1 | 8/2013 | Margulis et al. |
| 2014/0157842 | A1 * | 6/2014 | Almomani ......... G07C 9/00309 70/277 |
| 2014/0205083 | A1 | 7/2014 | Pryakhin et al. |
| 2014/0263674 | A1 | 9/2014 | Cerveny |
| 2014/0265049 | A1 | 9/2014 | Burris et al. |
| 2014/0308153 | A1 | 10/2014 | Ljungblad |
| 2014/0361464 | A1 | 12/2014 | Holcomb |
| 2015/0147585 | A1 | 5/2015 | Schwarze et al. |
| 2015/0177158 | A1 | 6/2015 | Cheverton |
| 2015/0242737 | A1 | 8/2015 | Glazberg et al. |
| 2015/0290881 | A1 | 10/2015 | Ederer et al. |
| 2015/0308337 | A1 | 10/2015 | Marasco et al. |
| 2015/0324677 | A1 | 11/2015 | Talyansky et al. |
| 2016/0067779 | A1 | 3/2016 | Dautova et al. |
| 2016/0107764 | A1 | 4/2016 | O'Kell et al. |
| 2016/0207345 | A1 | 7/2016 | Farmer et al. |
| 2016/0229120 | A1 | 8/2016 | Levine et al. |
| 2016/0253586 | A1 | 9/2016 | Cook et al. |
| 2016/0259306 | A1 | 9/2016 | Pangrazio, III et al. |
| 2016/0260001 | A1 | 9/2016 | Flores et al. |
| 2016/0283834 | A1 | 9/2016 | Bobbitt, III |
| 2016/0298268 | A1 | 10/2016 | Gallucci et al. |
| 2016/0306088 | A1 | 10/2016 | Ouderkirk et al. |
| 2016/0307083 | A1 | 10/2016 | Kumar et al. |
| 2016/0311164 | A1 | 10/2016 | Miyano |
| 2017/0083011 | A1 | 3/2017 | Hughes |
| 2017/0284213 | A1 | 10/2017 | Lieble et al. |
| 2017/0372127 | A1 | 12/2017 | Meany et al. |
| 2018/0171802 | A1 * | 6/2018 | Lacy ....................... F01D 5/147 |
| 2018/0290395 | A1 | 10/2018 | Gold et al. |
| 2018/0292331 | A1 | 10/2018 | Gold et al. |
| 2018/0292337 | A1 | 10/2018 | Gold et al. |
| 2018/0293372 | A1 | 10/2018 | Gold et al. |
| 2018/0293476 | A1 | 10/2018 | Gold |
| 2018/0293591 | A1 | 10/2018 | Spears |
| 2018/0293592 | A1 | 10/2018 | Gold et al. |
| 2018/0369918 | A1 | 12/2018 | Gold |
| 2019/0338655 | A1 * | 11/2019 | Ahmad ..................... F01D 5/26 |
| 2020/0166432 | A1 * | 5/2020 | Schleif ................... F01D 17/06 |

FOREIGN PATENT DOCUMENTS

WO  WO2016/109111 A1  7/2016
WO  WO-2018001708 A1 *  1/2018  ............... F01D 5/26

OTHER PUBLICATIONS

Peyre et al., Laser shock processing: A review of the physics and applications, Optical and Quantum Electronics, vol. 27, Dec. 1995, pp. 1213-1229.

* cited by examiner

MATED COMPONENTS AND METHOD AND SYSTEM THEREFORE

FIELD

The present subject matter relates generally to methods for forming mated components, and more particularly, to systems and methods for using a geometric key to form components with unique mating geometries.

BACKGROUND

Original equipment manufacturers (OEMs) in a variety of industries have an interest in ensuring that replacement components used with their products or equipment are manufactured according to standards set and controlled by the OEM. Using the aviation industry as an example, the manufacturer of gas turbine engines, as well as the airlines and the passengers that rely on them, can be exposed to serious risks if counterfeit or replica replacement parts are readily available for and installed on these engines.

Such counterfeit components can pose a severe risk to the integrity of the gas turbine engines or may otherwise result in a variety of problems for the OEM and the end user. More specifically, OEM components may require rigorous attention to detail to ensure sound material properties and capabilities for the specific application as well as sophisticated inspections to verify the component performance. OEMs cannot ensure the integrity or compatibility of counterfeit parts, which may result in dangerous engine operation and increase the risk of potential failure.

In addition, counterfeit parts compromise the OEMs ability to control the quality associated with their products. For example, inexpensive replicas and inferior components on the market are a real threat, both to the engines on which they are installed and to the reputation of the OEM. Moreover, failure of a gas turbine engine due to a counterfeit replacement component might subject the OEM to misdirected legal liability. Additionally, OEMs may lose a significant revenue stream by not being able to control the sale of OEM replacement components.

Additive manufacturing technologies are maturing at a fast pace. For example, very accurate additive manufacturing printers, which use a variety of materials, such as metals and polymers, are becoming available at decreasing costs. In addition, improved scanning technologies and modeling tools are now available. As a result, certain OEMs are beginning to use such technologies to produce original and replacement parts. However, the advance of additive manufacturing technologies also results in a lower barrier to entry into the additive manufacturing space. Therefore, replacement components may be more easily reverse engineered and copied, and there is an increased risk of third parties manufacturing and installing counterfeit components on OEM equipment, such as a gas turbine engine, resulting in the dangers described briefly above.

Accordingly, a system and method for manufacturing components such that they may be identified as genuine and cannot be easily duplicated by an unauthorized third party and passed off as genuine OEM parts would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a method of forming a component pair is provided. The method includes obtaining a component identifier of a first component, the first component defining a first mating surface having a first geometry and obtaining a geometric key associated with the component identifier. The method further includes determining a second geometry using the geometric key, the second geometry being complementary to the first geometry and forming the second geometry on a second mating surface of a second component of the component pair.

In another exemplary aspect of the present disclosure, a component pair is provided including a first component including a first mating surface defining a first geometry associated with a geometric key and a second component including a second mating surface defining a second geometry, the second geometry being determined using the geometric key and being complementary to the first geometry, wherein the first component and the second component may be properly mated together only when the first geometry is received by the second geometry.

In yet another exemplary aspect of the present disclosure, a system for forming a component pair is provided. The system includes one or more processors and one or more memory devices, the one or more memory devices storing computer-readable instructions that when executed by the one or more processors cause the one or more processors to perform operations. The operations include obtaining a component identifier of a first component, the first component defining a first mating surface having a first geometry and obtaining a geometric key associated with the component identifier. The operations further include determining a second geometry using the geometric key, the second geometry being complementary to the first geometry and forming the second geometry on a second mating surface of a second component of the component pair.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
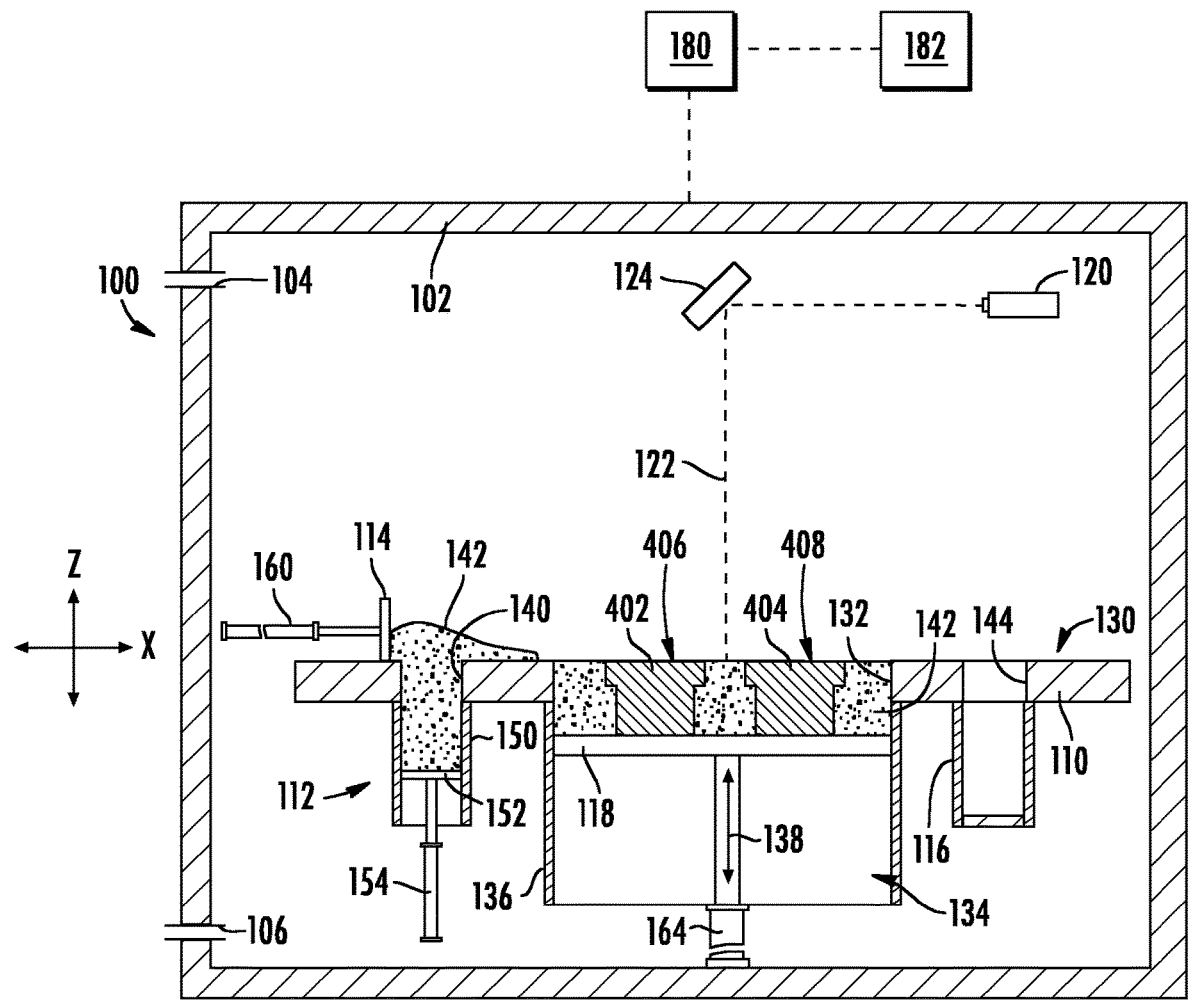
FIG. 1 shows a schematic view of an additive manufacturing machine according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the accompanying drawings. Each example is provided by way of explanation of the invention, not limitation of the invention. In fact, it will be apparent to those skilled in the art that various configurations, modifications, and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. In addition, as used herein, terms of approximation, such as "approximately," "substantially," or "about," refer to being within a ten percent margin of error.

Aspects of the present subject matter are directed to a method of forming a matched or mated component pair including forming a first geometry on a first mating surface of a first component and a complementary second geometry on a second mating surface of a second component. The first geometry and the second geometry can be determined from a geometric key associated with a component identifier, e.g., by inputting the geometric key into a mathematical algorithm or random number generator. When a replacement for the second component is needed, the component identifier may be obtained from the first component, the component identifier may be used to obtain the geometric key, and the geometric key may then be used to determine the second geometry. The second geometry may then be formed on the second component such the second component may properly mate with the mated first component.

In general, the components described herein may be manufactured or formed using any suitable process. However, in accordance with several aspects of the present subject matter, these components may be formed using an additive-manufacturing process, such as a 3-D printing process. The use of such a process may allow the components to be formed integrally, as a single monolithic component, or as any suitable number of sub-components. In particular, the manufacturing process may allow these components to be integrally formed and include a variety of features not possible when using prior manufacturing methods. For example, the additive manufacturing methods described herein enable the manufacture of components having various features, configurations, thicknesses, materials, densities, surface variations, and identifying features not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, but are not limited to, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent, for example, a photo-curable polymer or another liquid bonding agent, onto each layer of powder. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed by fusing material, e.g., by polymerizing a plastic using laser energy or heat or by sintering or melting metal powder. For example, a particular type of additive manufacturing process may use an energy beam, like an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as needed depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, and other component properties or features.

Notably, in exemplary embodiments, several aspects and features of the present subject matter were previously not possible due to manufacturing restraints. However, the present inventors have advantageously utilized current advances in additive manufacturing techniques to improve various components and the method of additively manufacturing such components. While the present disclosure is not limited to the use of additive manufacturing to form these components generally, additive manufacturing does provide a variety of manufacturing advantages, including ease of manufacturing, reduced cost, greater accuracy, etc.

Also, the additive manufacturing methods described above enable much more complex and intricate shapes and contours of the components described herein to be formed with a very high level of precision. For example, such components may include thin additively manufactured layers, cross-sectional features, and component contours. In addition, the additive manufacturing process enables the manufacture of a single component having different materials such that different portions of the component may exhibit different performance characteristics. The successive, additive nature of the manufacturing process enables the construction of these novel features. As a result, components formed using the methods described herein may exhibit improved performance and reliability.

Referring now to FIG. 1, an exemplary laser powder bed fusion system, such as a DMLS or DMLM system 100, will be described according to an exemplary embodiment. Specifically, AM system 100 is described herein as being used to build all or a portion of one or more components. It should be appreciated that the components described herein are only exemplary components to be built and are used primarily to facilitate description of the operation of AM machine 100. The present subject matter is not intended to be limited in this regard to the formation of the components as described, but instead AM machine 100 may be used for printing any suitable number, type, and configuration of components or features of components.

As illustrated, AM system 100 generally defines a vertical direction V or Z-direction, a lateral direction L or X-direction, and a transverse direction T or Y-direction (not shown in FIG. 1), each of which is mutually perpendicular, such that an orthogonal coordinate system is generally defined. As illustrated, system 100 includes a fixed enclosure or build area 102 that provides a contaminant-free and controlled environment for performing an additive manufacturing process. In this regard, for example, enclosure 102 serves to isolate and protect the other components of the system 100. In addition, enclosure 102 may be provided with a flow of an appropriate shielding gas, such as nitrogen, argon, or another suitable gas or gas mixture. In this regard, enclosure 102 may define a gas inlet port 104 and a gas outlet port 106 for receiving a flow of gas to create a static pressurized volume or a dynamic flow of gas.

Enclosure 102 may generally contain some or all components of AM system 100. According to an exemplary embodiment, AM system 100 generally includes a table 110, a powder supply 112, a scraper or recoater mechanism 114, an overflow container or reservoir 116, and a build platform 118 positioned within enclosure 102. In addition, an energy source 120 generates an energy beam 122 and a beam steering apparatus 124 directs energy beam 122 to facilitate the AM process as described in more detail below. Each of these components will be described in more detail below.

According to the illustrated embodiment, table 110 is a rigid structure defining a planar build surface 130. In addition, planar build surface 130 defines a build opening 132 through which build chamber 134 may be accessed. More specifically, according to the illustrated embodiment, build chamber 134 is defined at least in part by vertical walls 136 and build platform 118. Notably, build platform 118 is movable along a build direction 138 relative to build surface 130. More specifically, build direction 138 may correspond to the vertical direction V, such that moving build platform 118 down increases the height of the part being printed and the build chamber 134. In addition, build surface 130 defines a supply opening 140 through which additive powder 142 may be supplied from powder supply 112 and a reservoir opening 144 through which excess additive powder 142 may pass into overflow reservoir 116. Collected additive powders may optionally be treated to sieve out loose, agglomerated particles before re-use.

Powder supply 112 generally includes an additive powder supply container 150 that generally contains a volume of additive powder 142 sufficient for some or all of the additive manufacturing process for a specific part or parts. In addition, powder supply 112 includes a supply platform 152, which is a plate-like structure that is movable along the vertical direction within powder supply container 150. More specifically, a supply actuator 154 vertically supports supply platform 152 and selectively moves it up and down during the additive manufacturing process.

AM system 100 further includes recoater mechanism 114, which is a rigid, laterally-elongated structure that lies proximate build surface 130. For example, recoater mechanism 114 may be a hard scraper, a soft squeegee, or a roller. Recoater mechanism 114 is operably coupled to a recoater actuator 160 that is operable to selectively move recoater mechanism 114 along build surface 130. In addition, a platform actuator 164 is operably coupled to build platform 118 and is generally operable for moving build platform 118 along the vertical direction during the build process. Although actuators 154, 160, and 164 are illustrated as being hydraulic actuators, it should be appreciated that any other type and configuration of actuators may be used according to alternative embodiments, such as pneumatic actuators, hydraulic actuators, ball screw linear electric actuators, or any other suitable vertical support means. Other configurations are possible and within the scope of the present subject matter.

As used herein, "energy source" may be used to refer to any device or system of devices configured for directing an energy beam of suitable power and other operating characteristics towards a layer of additive powder to sinter, melt, or otherwise fuse a portion of that layer of additive powder during the build process. For example, energy source 120 may be a laser or any other suitable irradiation emission directing device or irradiation device. In this regard, an irradiation or laser source may originate photons or laser beam irradiation that is directed by the irradiation emission directing device or beam steering apparatus.

According to an exemplary embodiment, beam steering apparatus 124 includes one or more mirrors, prisms, lenses, and/or electromagnets operably coupled with suitable actuators and arranged to direct and focus energy beam 122. In this regard, for example, beam steering apparatus 124 may be a galvanometer scanner that moves or scans the focal point of the laser beam 122 emitted by energy source 120 across the build surface 130 during the laser melting and sintering processes. In this regard, energy beam 122 can be focused to a desired spot size and steered to a desired position in plane coincident with build surface 130. The galvanometer scanner in powder bed fusion technologies is typically of a fixed position but the movable mirrors/lenses contained therein allow various properties of the laser beam to be controlled and adjusted. According to exemplary embodiments, beam steering apparatus may further include one or more of the following: optical lenses, deflectors, mirrors, beam splitters, telecentric lenses, etc.

It should be appreciated that other types of energy sources 120 may be used that may use an alternative beam steering apparatus 124. For example, an electron beam gun or other electron source may be used to originate a beam of electrons (e.g., an "e-beam"). The e-beam may be directed by any suitable irradiation emission directing device preferably in a vacuum. When the irradiation source is an electron source, the irradiation emission directing device may be, for example, an electronic control unit which may include, for example, deflector coils, focusing coils, or similar elements. According to still other embodiments, energy source 120 may include one or more of a laser, an electron beam, a plasma arc, an electric arc, etc.

Prior to an additive manufacturing process, recoater actuator 160 may be lowered to provide a supply of powder 142 of a desired composition (for example, metallic, ceramic, and/or organic powder) into supply container 150. In addition, platform actuator 164 may move build platform 118 to an initial high position, e.g., such that it is substantially flush or coplanar with build surface 130. Build platform 118 is then lowered below build surface 130 by a selected layer increment. The layer increment affects the speed of the additive manufacturing process and the resolution of parts or components being manufactured. As an example, the layer increment may be about 10 to 100 micrometers (0.0004 to 0.004 in.).

Additive powder is then deposited over the build platform 118 before being fused by energy source 120. Specifically, supply actuator 154 may raise supply platform 152 to push powder through supply opening 140, exposing it above build surface 130. Recoater mechanism 114 may then be moved across build surface 130 by recoater actuator 160 to spread the raised additive powder 142 horizontally over build platform 118 (e.g., at the selected layer increment or thickness). Any excess additive powder 142 drops through the reservoir opening 144 into the overflow reservoir 116 as recoater mechanism 114 passes from left to right (as shown in FIG. 1). Subsequently, recoater mechanism 114 may be moved back to a starting position.

Figure 2:
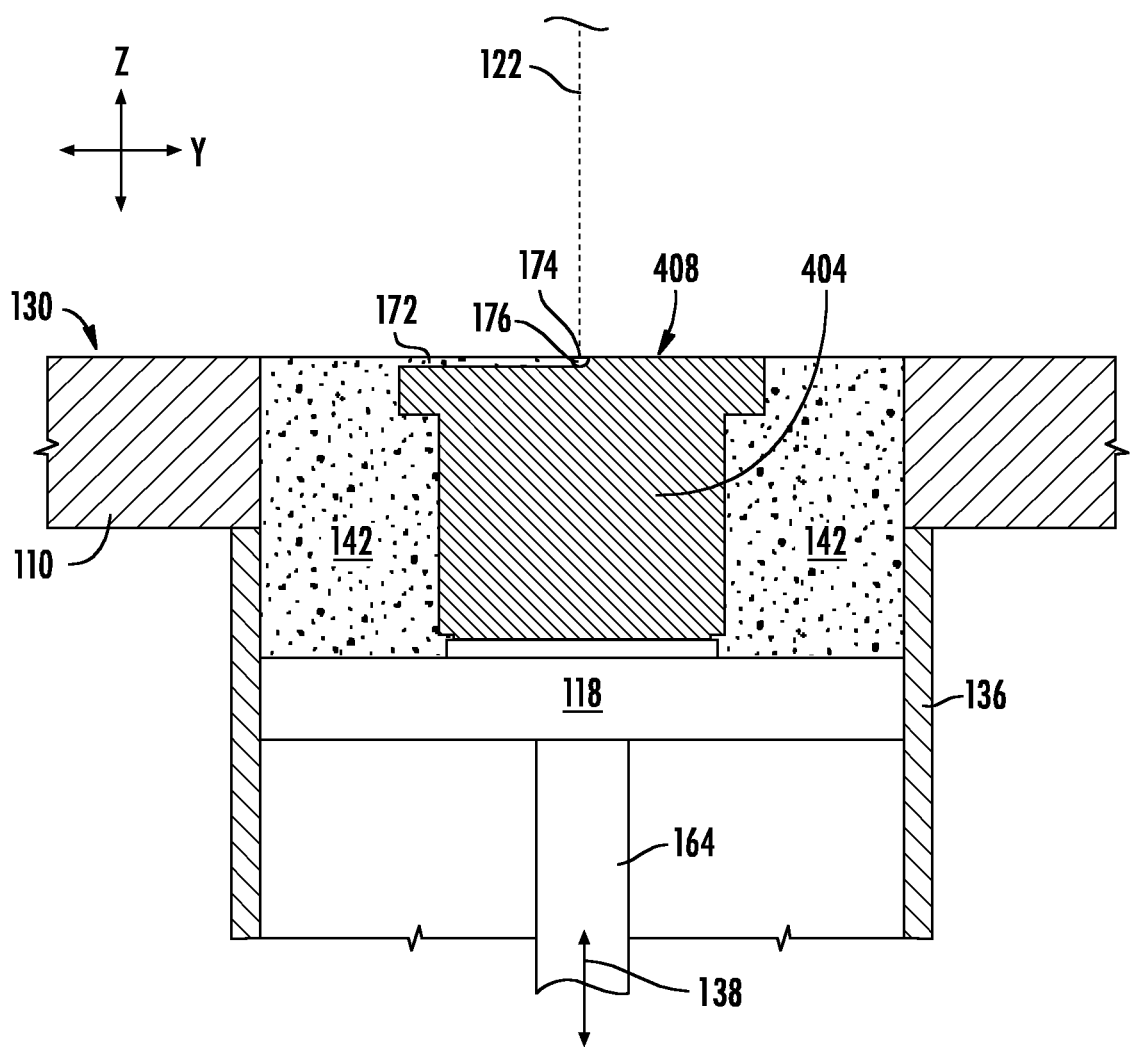
FIG. 2 shows a close-up schematic view of a build platform of the exemplary additive manufacturing machine of FIG. 1 according to an exemplary embodiment of the present subject matter.

Therefore, as explained herein and illustrated in FIG. 1, recoater mechanism 114, recoater actuator 160, supply platform 152, and supply actuator 154 may generally operate to successively deposit layers of additive powder 142 or other additive material to facilitate the print process. As such, these components may collectively be referred to herein as powder dispensing apparatus, system, or assembly. The leveled additive powder 142 may be referred to as a "build layer" 172 (see FIG. 2) and the exposed upper surface thereof may be referred to as build surface 130. When build platform 118 is lowered into build chamber 134 during a build process, build chamber 134 and build platform 118 collectively surround and support a mass of additive powder 142 along with any components being built. This mass of powder is generally referred to as a "powder bed," and this specific category of additive manufacturing process may be referred to as a "powder bed process."

During the additive manufacturing process, the directed energy source 120 is used to melt a two-dimensional cross-section or layer of the component being built. More specifically, energy beam 122 is emitted from energy source 120 and beam steering apparatus 124 is used to steer the focal point 174 of energy beam 122 over the exposed powder surface in an appropriate pattern (referred to herein as a "toolpath"). A small portion of exposed layer of the additive powder 142 surrounding focal point 174, referred to herein as a "weld pool" or "melt pool" or "heat effected zone" 176 (best seen in FIG. 2) is heated by energy beam 122 to a temperature allowing it to sinter or melt, flow, and consolidate. As an example, melt pool 176 may be on the order of 100 micrometers (0.004 in.) wide. This step may be referred to as fusing additive powder 142.

Build platform 118 is moved vertically downward by the layer increment, and another layer of additive powder 142 is applied in a similar thickness. The directed energy source 120 again emits energy beam 122 and beam steering apparatus 124 is used to steer the focal point 174 of energy beam 122 over the exposed powder surface in an appropriate pattern. The exposed layer of additive powder 142 is heated by energy beam 122 to a temperature allowing it to sinter or melt, flow, and consolidate both within the top layer and with the lower, previously-solidified layer. This cycle of moving build platform 118, applying additive powder 142, and then directed energy beam 122 to melt additive powder 142 is repeated until the entire component is complete.

Referring again to FIG. 1, AM system 100 may include a system controller 180 that may be operably coupled with some or all parts of AM system 100 or external control systems for facilitating system operation. For example, system controller 180 may be operably coupled to a user interface panel 182 to permit operator communication with AM system 100, e.g., to input commands, upload printing toolpaths or CAD models, initiating operating cycles, or otherwise control the operation of various components of AM machine 100. In general, controller 180 may operably couple all systems and subsystems within AM system 100 to permit communication and data transfer therebetween. In this manner, controller 180 may be generally configured for operating AM system 100 and/or performing one or more of the methods described herein.

Figure 3:
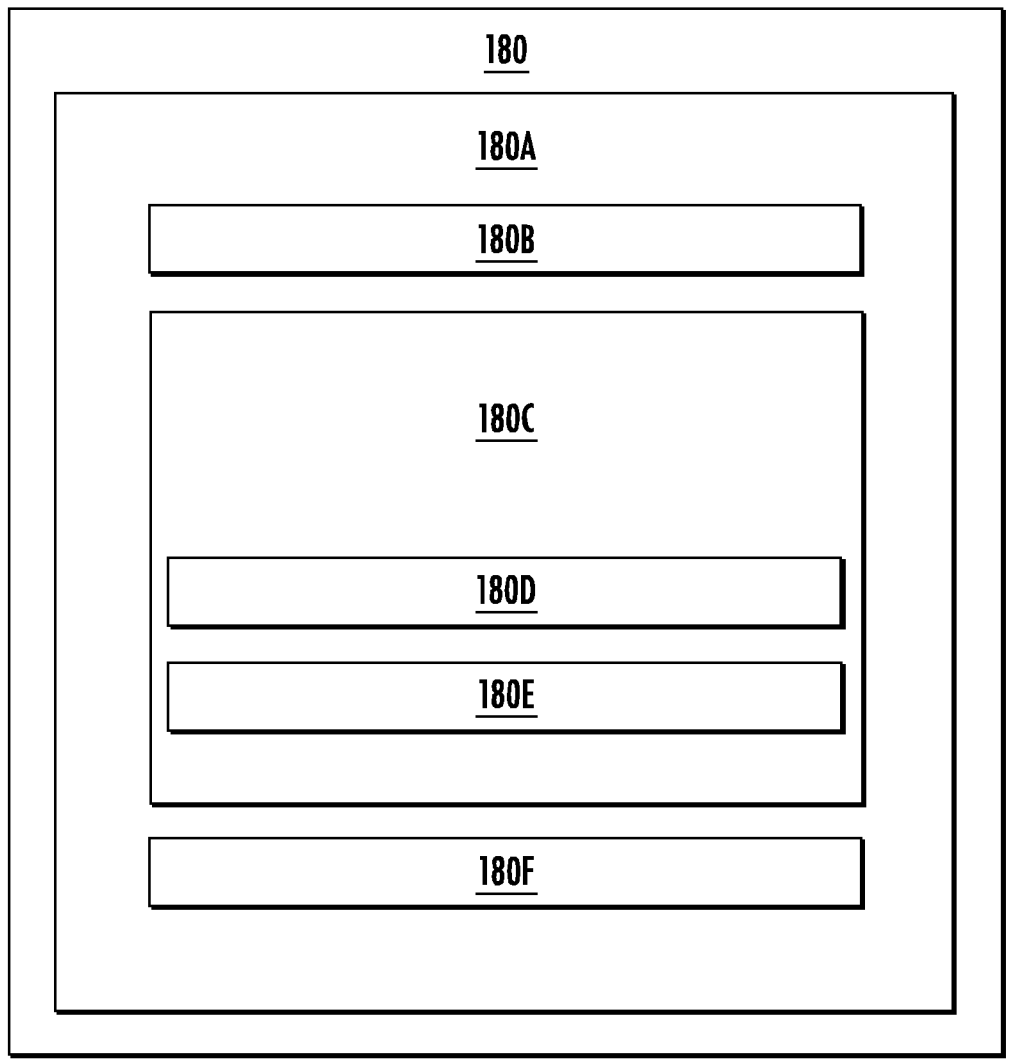
FIG. 3 depicts certain components of a controller according to example embodiments of the present subject matter.

FIG. 3 depicts certain components of controller 180 according to example embodiments of the present disclosure. Controller 180 can include one or more computing device(s) 180A which may be used to implement methods as described herein. Computing device(s) 180A can include one or more processor(s) 180B and one or more memory device(s) 180C. The one or more processor(s) 180B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 180C can include one or more non-transitory computer-readable storage medium(s), such as RAM, ROM, EEPROM, EPROM, flash memory devices, magnetic disks, etc., and/or combinations thereof.

The memory device(s) 180C can include one or more computer-readable media and can store information accessible by the one or more processor(s) 180B, including instructions 180D that can be executed by the one or more processor(s) 180B. For instance, the memory device(s) 180C can store instructions 180D for running one or more software applications, displaying a user interface, receiving user input, processing user input, etc. In some implementations, the instructions 180D can be executed by the one or more processor(s) 180B to cause the one or more processor(s) 180B to perform operations, e.g., such as one or more portions of methods described herein. The instructions 180D can be software written in any suitable programming language or can be implemented in hardware. Additionally, and/or alternatively, the instructions 180D can be executed in logically and/or virtually separate threads on processor(s) 180B.

The one or more memory device(s) 180C can also store data 180E that can be retrieved, manipulated, created, or stored by the one or more processor(s) 180B. The data 180E can include, for instance, data to facilitate performance of methods described herein. The data 180E can be stored in one or more database(s). The one or more database(s) can be connected to controller 180 by a high bandwidth LAN or WAN, or can also be connected to controller through one or more network(s) (not shown). The one or more database(s) can be split up so that they are located in multiple locales. In some implementations, the data 180E can be received from another device.

The computing device(s) 180A can also include a communication module or interface 180F used to communicate with one or more other component(s) of controller 180 or additive manufacturing machine 100 over the network(s). The communication interface 180F can include any suitable components for interfacing with one or more network(s), including for example, transmitters, receivers, ports, controllers, antennas, or other suitable components.

Now that the construction and configuration of AM system 100 has been described according to exemplary embodiments of the present subject matter, exemplary methods 200 and 300 for forming matched or mated component pairs or replacement components will be described according to an exemplary embodiment of the present subject matter. Methods 200, 300 can be used to form components using AM machine 100 or any other suitable component using any other suitable additive manufacturing machine or system. In this regard, for example, controller 180 may be configured for implementing some or all steps of methods 200, 300. Further, it should be appreciated that the exemplary methods 200, 300 are discussed herein only to describe exemplary aspects of the present subject matter, and are not intended to be limiting.

Method 200 generally provides a method for forming a component pair. In this regard, the term "component pair" is used herein to generally refer to any two or more components that have mating surfaces with unique geometries intended to engage, receive, or otherwise mate with each other. For example, each component within a component pair may define mating surfaces that may properly mate or engage a surface or surfaces from other components that are part of the component pair. In this regard, the component pairs described herein define mating surfaces with geometries that are complementary to each other, that are substantially unique, and that are preferably difficult to counterfeit or replicate using conventional scanning and manufacturing techniques. It should be appreciated that according to exemplary embodiments, the term "mating surfaces" may refer to features that need not necessarily contact each other, but which may otherwise engage or be received within each other.

In this manner, a manufacturer may form a component pair for use in any particular system or machine, and when one of the components of the component pair needs to be replaced, e.g., due to wear, degradation, etc., a replacement part will not be a counterfeit part, such that an operator or end user of a component pair may be sure that the replacement part is genuine hardware, specifically designed for ideal operation with its complementary component. In addition, the end user may be confident that the replacement part is designed for the operating environment, ensuring safe operation past original equipment purchase from the original equipment manufacturer (OEM). In addition, aspects of the present subject matter may apply when a component needs to be repaired, is damaged, or is completely missing. This is because the OEM may hold the specific geometric key associated with the unique geometric surfaces of the component pair to unlock genuine replacement parts. The geometric key thereby unlocks the ability to form an authentic replacement component having the complementary surface geometries for mating with the other components of the component pair.

Notably, the description herein refers to a component pair having a first component and a second component. However, it should be appreciated that according to alternative embodiments, a component pair is not necessarily limited to two components, but may include any suitable number of components having any suitable number of surfaces for engaging other components that are a part of the component pair. In addition, the terms "first" and "second" are not intended to refer to the base component and replacement component, or to indicate any other significance or relative importance of the components.

Figure 4:
FIG. 4 provides a method of forming a component pair according to an exemplary embodiment of the present subject matter.

Referring now to FIG. 4, method 200 includes, at step 210, assigning a component pair at least one component identifier and a geometric key. In general, the component identifier may be a readily identifiable serial number, barcode, or other part identifier that the user of the component pair may identify in order to determine what replacement component is needed. For example, if the component pair includes a first component and a second component mated together, and a user identifies the second component as needing replacement, the user may locate the component identifier on one or both of the first component and the second component. The component identifier may then be communicated to the OEM, an authorized replacement part manufacturer, or other approved vendor of authentic components that has the geometric key associated with that component identifier to order a replacement component.

According to exemplary embodiments, each component of a component pair may be identified using the same component identifier (i.e., identifying the pair) along with a component specific identifier. For example, the component identifier may include a master serial number (associated with the component pair) and a subcomponent identifier (such as A, B, C, etc. identifying each component within the component pair). Alternatively, each component may have a unique component identifier and an external database may be used to identify the component identifiers of each component within a component pair. An authorized replacement part manufacturer may input the component identifier into a database or system to generate or retrieve the specific geometric key associated with that specific component pair. According to exemplary embodiments, the step of "looking up in a database" could be as simple as looking up the right part drawing or solid part file for the corresponding geometry, e.g., using serial number or geometric key.

Step 210 may further include assigning the component pair a geometric key that is associated with a first geometry and a second geometry, the second geometry being complementary to the first geometry. As used herein, the term "geometric key" is intended to refer to any physical device, software, code, password, or other tangible or intangible key or access instrument that is configured for unlocking the unique geometries defined on the mating surfaces of each component of a component pair. In this regard, for example, the geometric key may define a physical profile of each mating surface that is unique to that component pair or to a set of component pairs. Notably, according to an exemplary embodiment, only an approved vendor or an authorized replacement part manufacturer may hold the geometric key.

According to exemplary embodiments, the geometric key is encrypted or otherwise maintained in a secure location to prevent others from easily replicating replacement components with the target mating surface geometry. According to an exemplary embodiment, the geometric key and the associated component identifier may be stored in a secure database for later retrieval. In addition, the geometric key can be used to obtain the surface geometries for the first and second component of the component pair in any suitable manner. For example, the first geometry of the first component and the second geometry of the second component may be obtained by inputting the geometric key into a mathematical algorithm that generates data indicative of such geometries.

According to alternative embodiments, any other suitable means or methods for converting the geometric key into usable surface geometries may be used while remaining within the scope of the present subject matter. According to exemplary embodiments, any suitable "geometric creation algorithm" may be used to generate the first and second geometry. For example, the geometric key may be passed into a geometric creation algorithm, such as a random number generator that generates the target surface geometries. According to another embodiment, a Merkle tree may be used to securely generate the first geometry and the second geometry using the geometric key. In this regard, a Merkle tree is a structure that allows for the efficient and secure verification of content by creating a digital fingerprint or geometry associated with the specific geometric key. For example, Merkle trees are a topic of cryptography, and as an example, may be used as part of the cryptocurrency verification process. It should be appreciated that the methods described herein for converting the geometric key into useful surface geometries are only exemplary and not intended to limit the scope of the present subject matter.

Step 220 includes determining the first geometry using the geometric key and step 230 includes forming the first geometry on a first mating surface of a first component of the component pair. In this regard, once the geometric key is used to obtain the unique first geometry, any suitable manufacturing process or technique may be used to form the first component. Similarly, step 240 includes determining the second geometry using the geometric key and step 250 includes forming the second geometry on a second mating surface of a second component of the component pair.

According to an exemplary embodiment, the step of forming the first or second geometry may be performed by additive manufacturing, e.g., using AM system 100. However, it should be appreciated that according to alternative embodiments, the first component, the second component, and/or their mating surfaces and geometries may be formed using any other suitable manufacturing method. For example, all or portions of the first component and the second component may be formed by casting, forging, machining, drilling, molding, etc.

Notably, by using a geometric key that is associated with unique mating surface geometries of a component pair, the first component and the second component may be formed such that they are uniquely compatible with each other and may be joined only when the first geometry of the first mating surface engages or is otherwise received by the second geometry of the second mating surface. Specifically, step 260 may include mating the first component and the second component by joining the second geometry of the second mating surface with the first geometry of the first mating surface.

Thus, method 200 is generally configured for forming a component set or a component pair that includes a plurality of components that are intended to be mated only with other components associated with the component set or pair. The mating geometries are "locked" in a geometric key that may be stored or maintained only by the original equipment manufacturer or an authorized replacement component manufacturer. Thus, when any component of the component pair needs to be replaced in the future, only those entities in possession of the geometric key may "unlock" the unique geometry of the component mating surface to quickly and easily form an authentic replacement component.

Method 300 is generally directed to the process of obtaining a replacement component. Specifically, referring to FIG. 5, method 300 includes, at step 310, obtaining a component identifier of a first component. As explained above, the first component may define a first mating surface having a first geometry that is unique to that particular component of a particular component pair. Using a component identifier from the first component or a second component (e.g., the replacement component), a geometric key associated with this component pair may be obtained by a replacement part manufacturer.

Specifically, step 320 includes obtaining a geometric key associated with the component identifier. Notably, as explained above, this geometric key may only be obtained by the original component manufacturer or an authorized replacement component manufacturer. In practice, a user of the component pair may identify that the component should be replaced, obtain the component identifier (e.g., a serial number), and communicate that serial number when placing an order for the replacement component (e.g., referred to herein as the second component).

Upon receiving the component identifier and the geometric key, step 330 may include determining a second geometry using the geometric key. This second geometry may be uniquely compatible with or complementary to the first geometry of the first component to establish the component pair. For example, as described above, the second geometry may be obtained by inputting the geometric key into a mathematical algorithm, a random number generator, a Merkle tree, or any other suitable software program or device that generates the unique second geometry from the geometric key. Step 340 includes forming the second geometry on a second mating surface of a second component of the component pair. Step 350 may include mating the first component and the second component by joining the second geometry of the second mating surface with the first geometry of the first mating surface.

Figure 5:
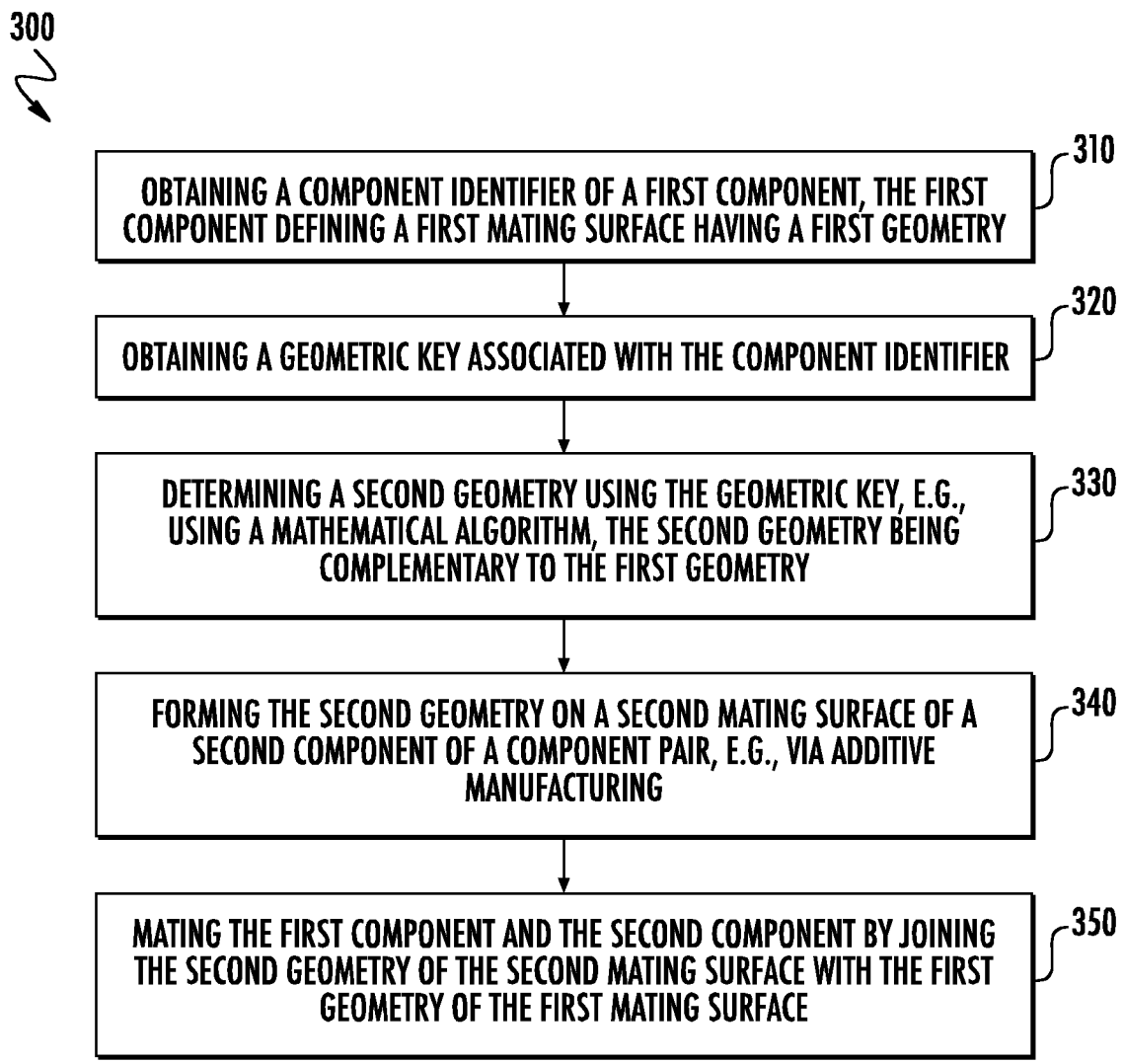
FIG. 5 provides a method of forming a replacement part of a component pair according to an exemplary embodiment of the present subject matter.

FIGS. 4 and 5 depict exemplary control methods having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using AM machine 100 as an example, it should be appreciated that these methods may be applied to forming components using any other suitable manufacturing process or system.

Referring now generally to FIGS. 6 through 9, exemplary component pairs 400 will be described according to exemplary embodiments of the present subject matter. Due to the similarity between the embodiments described in these figures, like reference numerals may be used to refer to the same or similar features. In addition, these component pairs 400 may be formed using methods 200 and 300 using any suitable manufacturing method or process, such as additive manufacturing, machining, etc. The components illustrated are only exemplary and intended to illustrate aspects of the present subject matter without limiting its scope.

Figure 6:
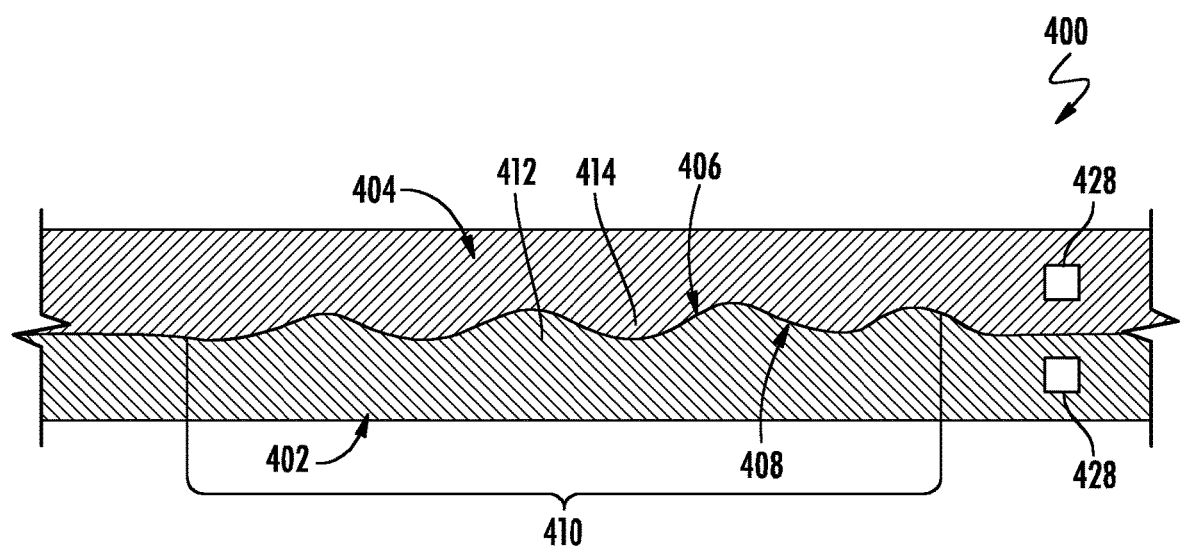
FIG. 6 is a schematic cross sectional view of a mated component pair according to an exemplary embodiment of the present subject matter.

Referring specifically to FIG. 6, a schematic representation of the mating surfaces of a first component 402 and a second component 404 will be described according to exemplary embodiments. This embodiment is intended as a simplified illustration of how any surface of the component may mate with a complementary surface of another component of a component pair or a component set. As shown, first component 402 defines a first mating surface 406 and second component 404 defines a second mating surface 408. According to this illustrated embodiment, only a portion of mating surfaces 406, 408 have unique complementary geometries. This region is referred to herein as a keyed region 410.

As shown, within keyed region 410, a first geometry 412 is defined on first mating surface 406. Similarly, within keyed region 410, a second geometry 414 is defined on second mating surface 408. Thus, first component 402 and second component 404 may only be joined if second geometry 414 is received within or engages first geometry 412. In this manner, component pair 400 may be designed such that it is properly mated or engaged only when first component 402 and second component 404 are authentic and properly aligned, e.g., such that keyed regions 410 are aligned and first geometry 412 is received within second geometry 414.

Although first geometry 412 and second geometry 414 are illustrated and described above as being formed on an exposed or otherwise visible surface of first component 402 and second component 404, it should be appreciated that the present subject matter is not limited to visible or "line of sight" features. In this regard, for example, first geometry 412 and/or second geometry 414 may be defined on surfaces at least partially within their respective components 402, 404. Alternatively, components 402, 404 may define additional features which hide or conceal first geometry 412 and/or second geometry 414. Moreover, according to exemplary embodiments, one or both of first geometry 412 and/or second geometry 414 may be hidden or not in direct line of sight from an outside of components 402, 404. The first geometry 412 and/or second geometry 414 may alternatively be positioned at any suitable location or locations on first component 402 and/or second component 404 that are inaccessible or otherwise difficult to detect or interrogate.

Figure 7:
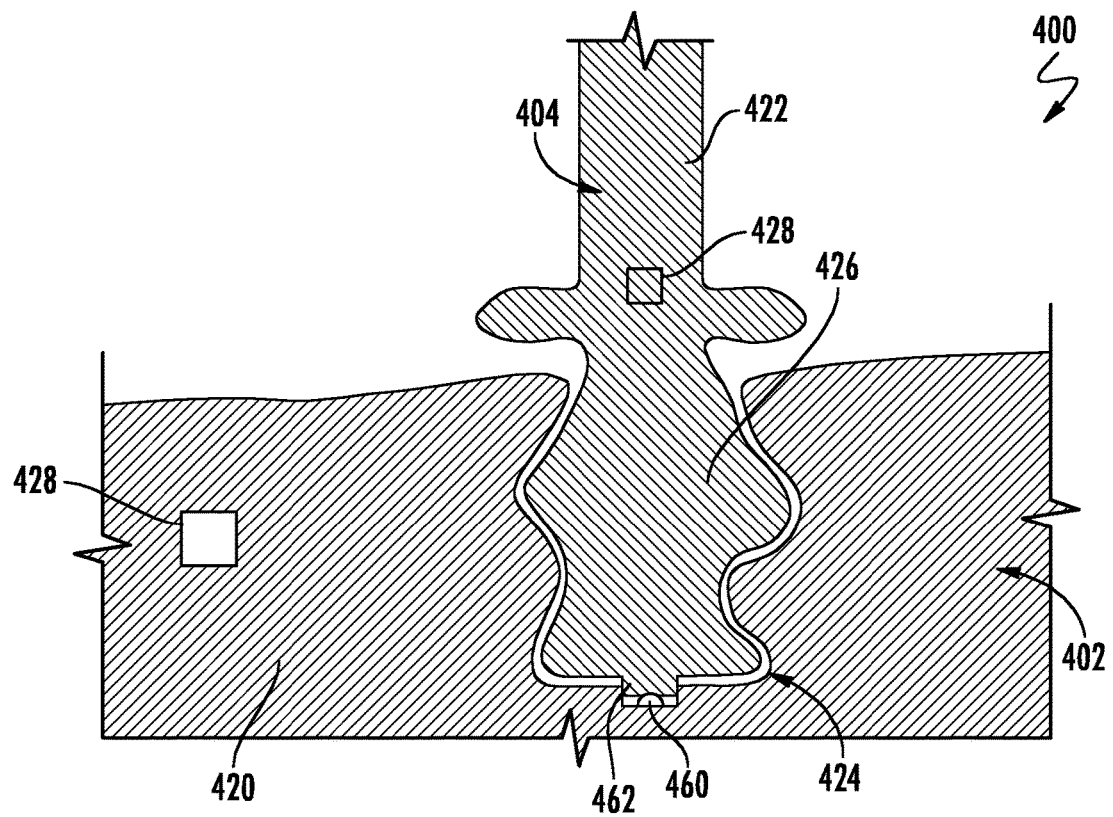
FIG. 7 is a schematic cross sectional view of a mated component pair according to another exemplary embodiment of the present subject matter.

Referring now to FIG. 7, component pair 400 may include a disk 420 for receiving a plurality of airfoils 422, e.g., for use in a gas turbine engine. In this regard, disk 420 may be first component 402 and may define first geometry 412 in the form of a slot 424 defined in disk 420. Second component 404 may include one or more airfoils 422 that define a second geometry 414 in the form of a dovetail 426 that is complementary to slot 424. Notably, in a similar manner as described above, slots 424 in disk 420 and dovetails 426 of each airfoil 422 are associated with a geometric key held by the original equipment manufacturer or an authorized replacement part manufacturer. Thus, when an end user wants to replace an airfoil 422, they must obtain the component identifier (e.g., identified herein by reference numeral 428, either on disk 420, airfoil 422, or both), provide component identifier 428 to the replacement part manufacturer to order the replacement airfoil 422. As described above, the component identifier 428 may be used to obtain a geometric key that may unlock the dovetail 426 geometry necessary for compatibility with slot 424 of disk 420.

It should be appreciated that any other suitable complementary geometries may be defined or be associated with components of a component pair 400 while remaining within the scope of the present subject matter. For example, component pair 400 may include a first pipe that is intended to be press fit or otherwise received within a second pipe. The geometric key may define noncircular diameter for each of the first pipe and the second pipe such that only the first pipe may be received within the second pipe. In addition, any other suitably unique sizing or geometry may be used to ensure the first pipe and the second pipe form a unique component pair as described herein. Other variations and modifications are possible and within the scope of the present subject matter.

Figure 8:
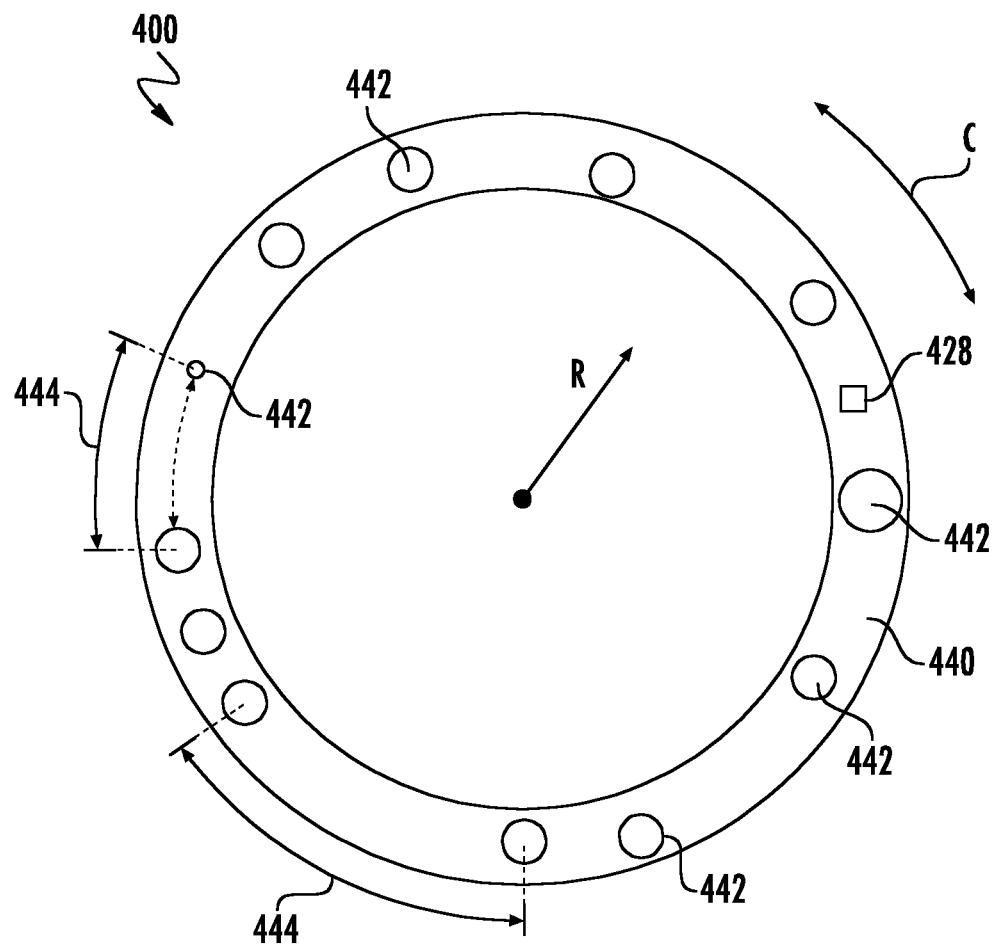
FIG. 8 shows a top view of a first component of a component pair according to yet another exemplary embodiment of the present subject matter.
Figure 9:
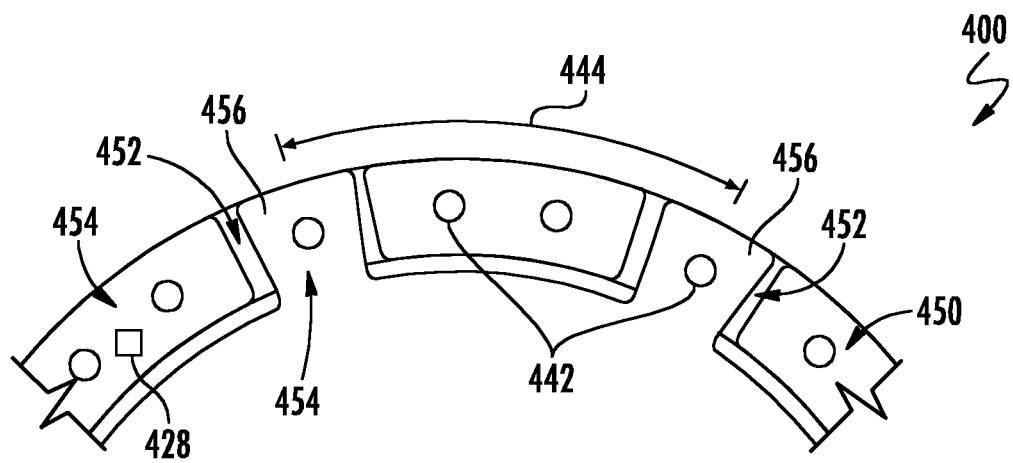
FIG. 9 shows a schematic representation of a component pair according to another exemplary embodiment of the present subject matter.

Referring now to FIGS. 8 and 9, the first component and the second component may be flanges that are formed to engage and secure with only complementary flanges. For example, FIG. 8 illustrates a flange 440 (e.g., equivalent to first component 402) defining a radial direction R and a circumferential direction C. As shown, flange 440 defines a plurality of bolt holes 442 spaced apart along circumferential direction C for receiving a complementary flange (e.g., equivalent to second component 404) having similar spaced and sized bolts or studs (not shown). Notably, the plurality of bolt holes 442 are spaced in a nonuniform pattern about first mating surface 406 and the complementary bolt studs (not shown) are similarly spaced. Specifically, the bolt hole spacing (e.g., identified by reference numeral 444) may vary in a nonuniform manner around the circumference of flange 440. In addition, bolt holes 442 may be positioned at varying radial locations or may have varying sizes. All of these features may be defined or associated with the geometric key held by the manufacturer.

Similarly, according to alternative embodiments, first geometry 412 and second geometry 414 may include any suitable interlocking features. For example, first geometry 412 may be a protruding or male part or feature and second geometry 414 may be a recessed or female part or feature that are interlocked with each other such that male part cannot be disengaged from female part after receipt, thereby forming an interlocked assembly.

For example, FIG. 9 illustrates a first flange 450 defining a plurality of dovetail pins 452 (e.g., the female part) and a second flange 454 defining a plurality of tails 456 (e.g., the male part) for being received within dovetail pins 452. Similar to the manner described above, the size and spacing of dovetail pins 452 and tails 456 may vary in a nonuniform manner and may be encoded into the geometric key. In this manner, in order to obtain a replacement part, e.g., second flange 454, the end user must obtain and provided component identifier 428 to an authorized manufacturer to order the replacement part.

According to still other embodiments, the geometric key may contain active deterrents to the use of counterfeit or replica replacement parts. In this regard, as opposed to simply relying on the inability to mate surfaces of incompatible parts, a component pair may include active triggers that must be engaged for a component or system to work properly. Alternatively, these active triggers may deactivate or disable a mechanical system, provide a warning indication or notification to a user, etc. Thus, for example, when first component 402 and second component 404 are properly mated, the trigger may be engaged and some action may be performed in response. For example, if a proper, authentic airfoil 422 does not trigger a feature on disc 420, the gas turbine engine may be disabled.

For example, referring again to FIG. 7, disc 420 may define a triggering feature 460 positioned proximate first mating surface 406 or within slot 424 of disc 420 and dovetail 426 of airfoil 422 may define a physical trigger 462. When an authentic dovetail 426 engages slot 424, the physical trigger 462 may depress triggering feature 460. The gas turbine may further be configured for shutting down or providing a warning if the triggering feature 460 is not triggered. It should be appreciated that according to alternative embodiments, any other suitable active trigger, switch, electrical contact, or other feature may be uniquely defined by a component pair 400 for performing any other suitable action or function while remaining within the scope of the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of forming a component pair,
the method comprising:
obtaining a geometric key associated with a component identifier of a first component,
the first component defining a first mating surface having a first geometry;
determining a second geometry using the geometric key, the second geometry being complementary to the first geometry; and
forming the second geometry on a second mating surface of a second component of the component pair,
wherein forming the second geometry comprises additively manufacturing at least a portion of the second component.

2. The method of claim 1, further comprising:
mating the first component and the second component by joining the second geometry of the second the mating surface with the first geometry of the first mating surface.

3. The method of claim 1, wherein determining the second geometry using the geometric key comprises:
generating, using the geometric key and a geometric creation algorithm, data indicative of the second geometry.

4. The method of claim 1, wherein the geometric key is encrypted.

5. The method of claim 1, further comprising:
assigning the component pair at least one component identifier and the geometric key;
determining a first geometry using the geometric key; and
forming the first geometry on the first mating surface of the first component of the component pair.

6. The method of claim 1, wherein the first mating surface further defines a triggering feature and the second mating surface defines a trigger, wherein the trigger engages the triggering feature only when the component pair is properly mated, the method further comprising:
performing an action in response to the triggering feature being engaged by the trigger.

7. The method of claim 1,
wherein determining the second geometry using the geometric key comprises:
generating,
using the geometric key and a mathematical algorithm,
data indicative of the second geometry.

8. The method of claim 1, further comprising:
recording the geometric key and the component identifier in a database for later recall.

9. A method of forming a component pair, the method comprising:
obtaining a geometric key associated with a component identifier of a first component, the first component defining a first mating surface having a first geometry;
determining a second geometry using the geometric key, the second geometry being complementary to the first geometry, wherein determining the second geometry using the geometric key comprises:
generating, using the geometric key and a mathematical algorithm, data indicative of the second geometry; and forming the second geometry on a second mating surface of a second component of the component pair.

10. The method of claim 9,
further comprising:
mating the first component and the second component by joining the second geometry of the second the mating surface with the first geometry of the first mating surface.

11. The method of claim 9,
wherein the geometric key is encrypted.

12. The method of claim 3,
further comprising:
recording the geometric key and the component identifier in a database for later recall.

13. The method of claim 9,
further comprising:
assigning the component pair at least one component identifier and the geometric key;
determining a first geometry using the geometric key; and
forming the first geometry on the first mating surface of the first component of the component pair.

14. The method of claim 9,
wherein the first mating surface further defines a triggering feature and the second mating surface defines a trigger,
wherein the trigger engages the triggering feature only when the component pair is properly mated, the method further comprising:
performing an action in response to the triggering feature being engaged by the trigger.

15. A method of forming a component pair, the method comprising:
obtaining a geometric key associated with a component identifier of a first component,
the first component defining a first mating surface having a first geometry;
determining a second geometry using the geometric key, the second geometry being complementary to the first geometry;
forming the second geometry on a second mating surface of a second component of the component pair; and
recording the geometric key and the component identifier in a database for later recall.

16. The method of claim 15,
further comprising:
mating the first component and the second component by joining the second geometry of the second the mating surface with the first geometry of the first mating surface.

17. The method of claim 15,
wherein determining the second geometry using the geometric key comprises:
generating, using the geometric key and a geometric creation algorithm, data indicative of the second geometry.

18. The method of claim 15,
wherein the geometric key is encrypted.

19. The method of claim 15,
further comprising:
assigning the component pair at least one component identifier and the geometric key;
determining a first geometry using the geometric key; and
forming the first geometry on the first mating surface of the first component of the component pair.

20. The method of claim 15,
wherein the first mating surface further defines a triggering feature and the second mating surface defines a trigger, wherein the trigger engages the triggering feature only when the component pair is properly mated, the method further comprising:

performing an action in response to the triggering feature being engaged by the trigger.

\* \* \* \* \*